United States Patent [19]

Kiriyama et al.

[11] Patent Number: 4,465,918
[45] Date of Patent: Aug. 14, 1984

[54] METHOD FOR CONTROLLING WELDING CURRENT

[75] Inventors: Satoru Kiriyama; Mikiji Suzuki, both of Aichi, Japan

[73] Assignee: Toyota Jidosha Kabushiki Kaisha, Toyota, Japan

[21] Appl. No.: 454,098

[22] Filed: Dec. 28, 1982

[51] Int. Cl.³ .............................................. B23K 11/24
[52] U.S. Cl. .................................... 219/110; 219/114
[58] Field of Search ................ 219/108, 109, 110, 114

[56] References Cited

U.S. PATENT DOCUMENTS

| | | | |
|---|---|---|---|
| 3,694,615 | 9/1972 | Brandeis | 219/110 |
| 4,104,724 | 8/1978 | Dix et al. | 219/108 |
| 4,289,948 | 9/1981 | Jurek et al. | 219/110 |
| 4,289,951 | 9/1981 | Jurek | 219/114 |

FOREIGN PATENT DOCUMENTS 1199429 7/1970 United Kingdom ................ 219/109

Primary Examiner—C. C. Shaw
Attorney, Agent, or Firm—Cushman, Darby & Cushman

[57] ABSTRACT

A method for controlling a welding current in a resistance welder which phase-controls an A.C. power supply voltage by a thyristor to control the welding current to a target value. Prior to supplying the welding current, a test current is supplied to measure a power-factor angle of a load. A plurality of curves representing relations between the welding currents and control voltages to a phase-shift pulse generator for a plurality of power-factor angles of the load are presets and one of the curves is selected in accordance with the selected power-factor angle of the load. A variation of the A.C. power supply voltage is measured. A period of a pulse generated by the phase-shift pulse generator is controlled based on a value determined in accordance with the selected curve and the measured variation of the A.C. power supply voltage to control a firing angle of the thyristor.

10 Claims, 7 Drawing Figures

F I G. 5
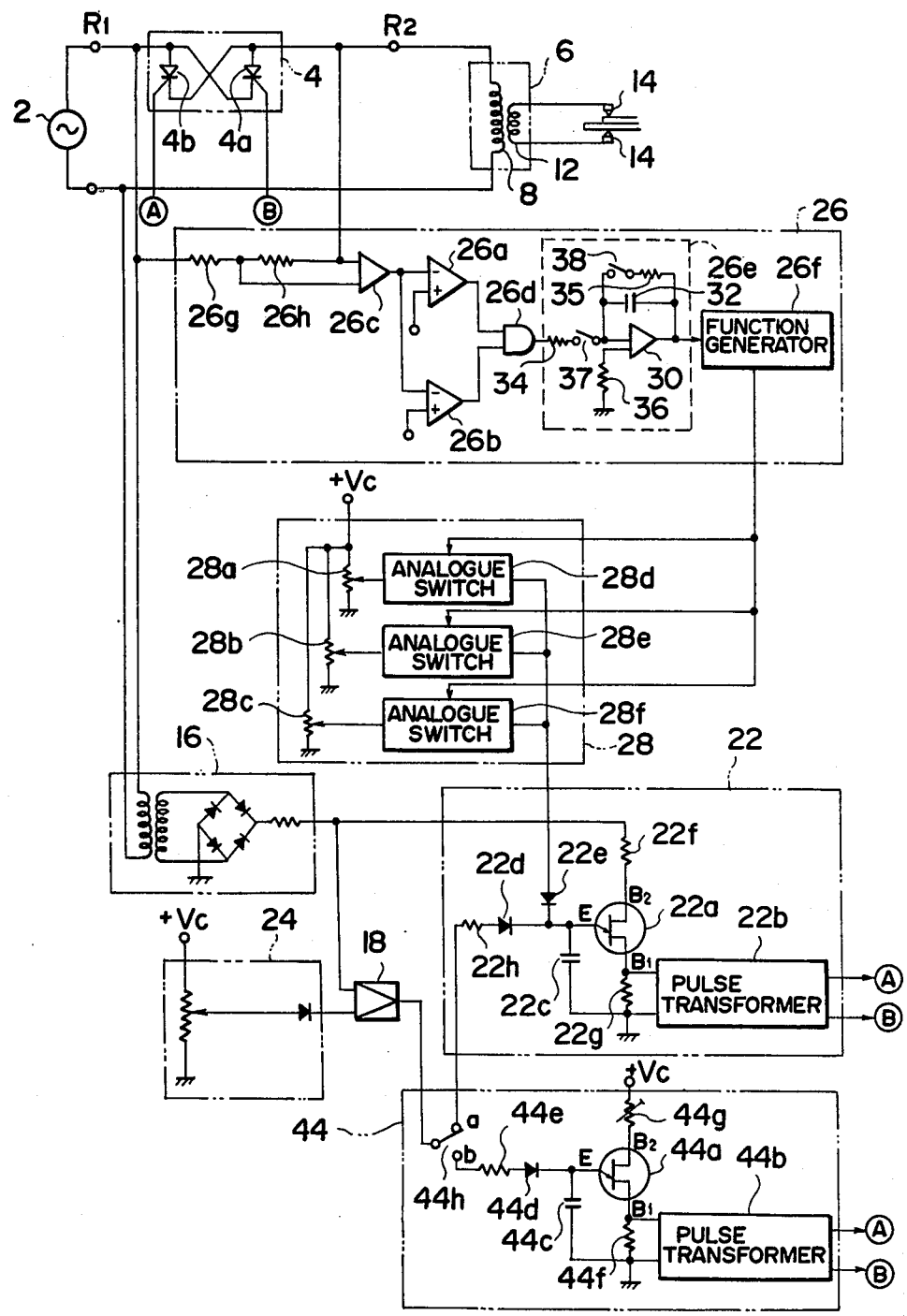

METHOD FOR CONTROLLING WELDING CURRENT

BACKGROUND OF THE INVENTION

The present invention relates to a method for controlling a welding current in a resistance welder, and more particularly to a method for controlling a welding current of a resistance welder such as a spot welder to a target value by adjusting a firing angle of a switching element to phase-control an A.C. power supply voltage and supplying the welding current to an article to be welded through a welding transformer.

FIG. 1 schematically shows a prior art spot welder. A switching element 4 comprising anti-parallel thyristors is connected to an A.C. power supply 2 and a primary winding 8 of a welding transformer 6 is connected to the switching element 4 so that a closed circuit is formed by the A.C. power supply 2, the switching element 4 and the primary winding 8 of the welding transformer 6. A controller 10 for controlling a phase of an A.C. voltage from the A.C. power supply 2 is connected to gate terminals of the switching element 4. A pair of electrodes 14 are connected to a secondary winding 12 of the welded transformer 6. An article to be welding is held between the electrodes 14.

A voltage waveform across terminals R and S of the A.C. power supply 2 is shown by Vin in FIG. 2. By setting a firing angle of the switching element 4 to $\alpha$ by the controller 10, firing pulses are applied to the gates of the switching element 4 at a timing of the firing angle $\alpha$ so that the switching element 4 is conducted to supply a current to the transformer 6. When the current becomes zero, the switching element 4 is extinguished. As a result, a voltage waveform Vout shown in FIG. 2 appears across a terminal $R_2$ downstream of the switching element 4 and the terminal $S_1$ and the welding current I is supplied during a conduction angle $\beta$.

In such a prior art spot welder, the welding current is controlled in the following manner. FIG. 3 shows a block diagram for controlling the welding current. A rectifier 16 is connected to the A.C. power supply 2. A clamp circuit 18 having a clamp voltage setter 24 connected thereto is connected to the rectifier 16. A phase-shift pulse generator 20 having a welding current command circuit 22 connected thereto is connected to the clamp circuit 18 and the phase-shift pulse generator 20 is connected to the switching element 4.

In such a prior art system, the voltage from the A.C. power supply 2 is rectified by the rectifier 16 and supplied to the clamp circuit 18. The clamp circuit 18 clamps that portion of the voltage supplied from the rectifier 16 which is higher than a voltage preset by the clamp voltage setter 24 and supplies that portion of the voltage to the phase-shift pulse generator 20 so that a control voltage corresponding to a variation of the voltage of the A.C. power supply 2 is supplied to the phase-shift pulse generator 20. A voltage corresponding to a desired welding current is manually set to the welding current command circuit 22 connected to the phase-shift pulse generator 20. This voltage is supplied to the phase-shift pulse generator 20. The phase-shift pulse generator 20 thus receives the control voltage corresponding to the variation of the A.C. power supply 2 and the voltage preset by the welding current command circuit 22 and supplies a pulsive firing angle signal determined by those voltages to the switching element 4 so that the switching element 4 conducts in accordance with the firing angle and phase-controlled such that the target welding current is maintained irrespective of the variation of the power supply voltage.

However, a relation between the welding current and the firing angle of the phase-shift pulse generator 20 varies depending on a power-factor of a load as shown in FIG. 4. In the prior art method for controlling the welding current, the welding current is compensated only in accordance with the variation of the power supply voltage without taking the variation of the power-factor of the load into consideration. Accordingly, it provides an accurate compensation for a load of a standard power-factor but cannot provide an accurate compensation for a load of a non-standard power-factor.

SUMMARY OF THE INVENTION

It is an object of the present invention to provide a method for controlling a welding current in a resistance welder which allows to control the welding current to a target value for a variable power-factor of a load.

According to the present invention, an A.C. power supply voltage is phase-controlled by controlling a firing angle of a switching element by a phase-shift pulse generator and the phase-controlled voltage is supplied to a welding transformer so that the welding current of the resistance welder is controlled to the target value. Prior to supplying the welding current, a test current is supplied and a power-factor angle of a load is measured and one of curves appropriate to the measured power-factor angle is selected from a plurality of predetermined curves representing relations between the welding currents and the control voltages supplied to the phase-shift pulse generator. A variation of the A.C. power supply voltage is also measured, and a period of a pulse generated by the phase-shift pulse generator is controlled based on a value determined by the selected curve and the variation of the A.C. power supply voltage in order to control the firing angle of the switching element.

By the above control method, the target welding current can be accurately attained without regard to the power-factor angle of the load.

BRIEF DESCRIPTION OF THE DRAWINGS

FIG. 5 shows a circuit diagram of one embodiment of the present invention;

DETAILED DESCRIPTION OF THE PREFERRED EMBODIMENT

Figure 1:
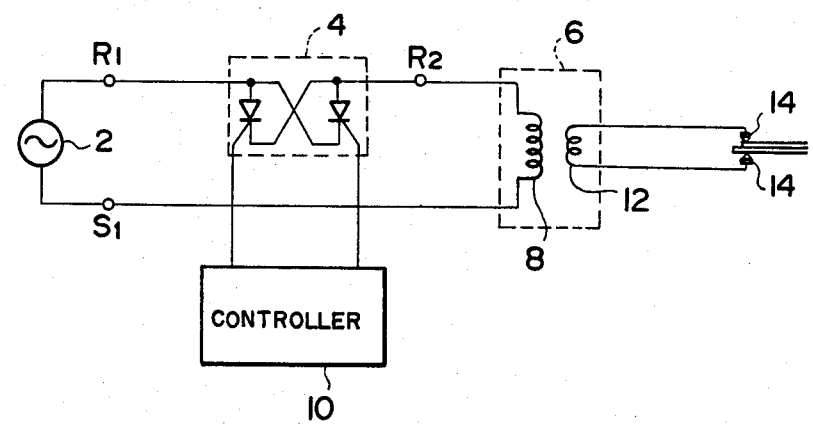
FIG. 1 shows a circuit diagram of a prior art resistance welder.
Figure 2:
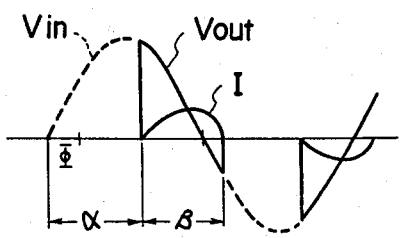
FIG. 2 shows a chart of voltage waveform, current waveform, firing angle and conduction angle.
Figure 3:
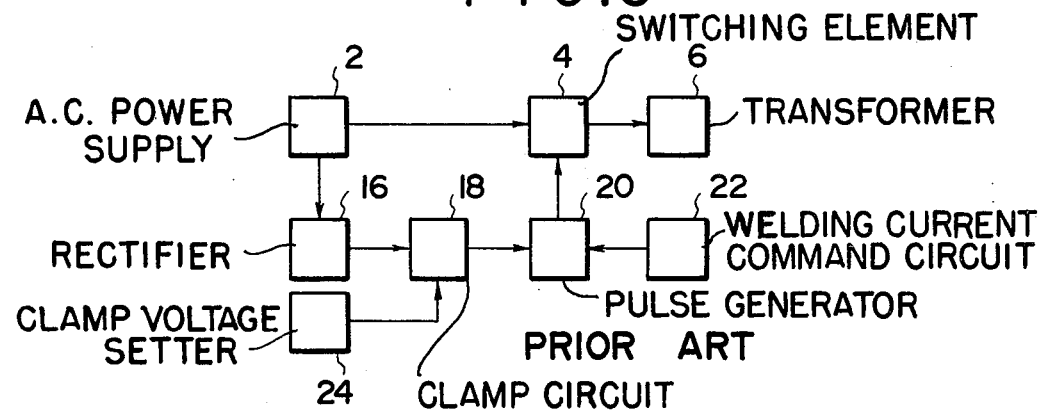
FIG. 3 shows a block diagram for effecting a prior art welding current control method.
Figure 4:
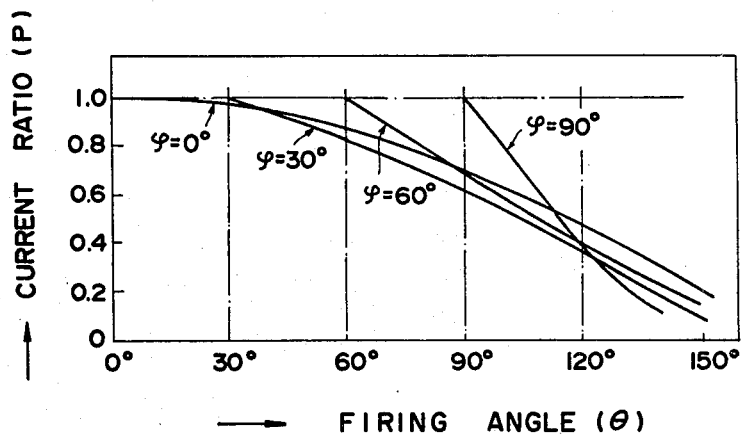
FIG. 4 shows a chart of a relation between a current ratio and a firing angle with a power-factor angle being a parameter.

Referring to FIG. 5, a preferred embodiment of the present invention is now explained. The like elements to those shown in FIGS. 1 and 3 are designated by the like numerals.

The A.C. power supply 2 is connected to the primary winding 8 of the welding transformer 6 through the switching element 4 comprising anti-parallel connected thyristors 4a and 4b. The electrodes 14 are connected to the secondary winding 12 of the welding transformer 6. The thyristor 4a and 4b are driven by pulse signals supplied from the phase-shift pulse generator 22 which will be described in detail later.

Numeral 26 denotes a power-factor angle measuring circuit which measures a power-factor angle based on a voltage across the switching element 4. First input terminals of comparators 26a and 26b are connected to an output terminal of a differential amplifier 26c, and reference voltages −50 mV and +50 mV, which are used so that the conduction or non-conduction of the thyristors is discriminated, are applied to second input terminals of the comparators 26a and 26b, respectively. The differential amplifier 26c supplies a voltage corresponding to a difference between an input voltage and an output voltage of the switching element 4 to the comparators 26a and 26b. Output terminals of the comparators 26a and 26b are connected to input terminals of an AND gate 26d and an output terminal thereof is connected to an input terminal of an integration circuit 26e. AND gate 26d outputs a high level signal while either thyristor 4a or 4b conducts. An output terminal of the integration circuit 26e is connected to an input terminal of a function generator 26f.

The integration circuit 26e includes an operational amplifier 30, a capacitor 32, resistors 34, 35 and 36 and switches 37 and 38. The circuit 26e is reset when switch 38 is on, integrates when the switch 37 is on and the switch 38 is off, outputs a voltage commensurate to a period of time when the thyristor 4a or 4b conducts and holds the integrated value when the switches 37 and 38 are off. The switches 37 and 38 are turned on and off by a controller not shown. Numerals 26g and 26h denote voltage dividers.

Figure 6:
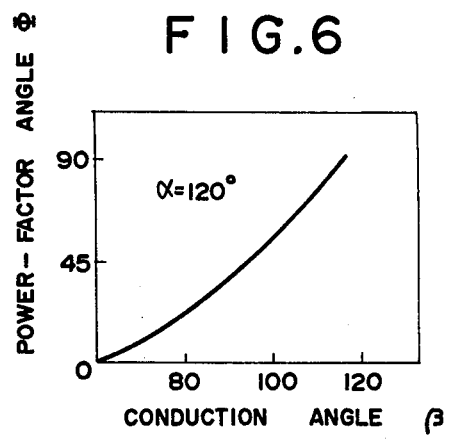
FIG. 6 shows a chart of a relation between a power-factor and a conduction angle.

The function generator 26f produces a curve representing a relation between a conduction angle $\beta$ and a power-factor angle $\Phi$ as shown in FIG. 6. It receives a voltage corresponding the conduction angle from the integration circuit 26e and produces a voltage representing the power-factor angle determined by the curve of FIG. 6. It may be constructed by a known technique.

Figure 7:
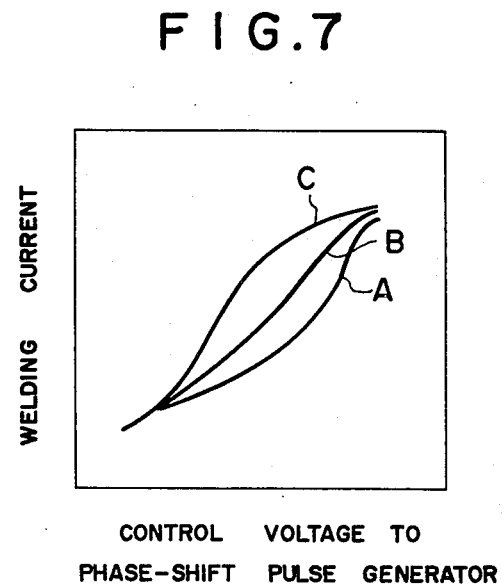
FIG. 7 shows a chart of a relation between a welding current and a control voltage to a phase-shift pulse generator.

Numeral 28 denotes a curve selection circuit which selects a control voltage to the phase-shift pulse generator 22 for the welding current as shown in FIG. 7 in accordance with the power-factor angle.

A constant voltage source +Vc is connected to analog switches 28d, 28e and 28f through variable resistors 28a, 28b and 28c of different specifications, respectively. Output terminals of the analog switches 28d, 28e and 28f are connected to the phase-shift pulse generator 22. Control terminals of the analog switches 28d, 28e and 28f are connected to the output terminal of the function generator 26f of the power-factor angle measuring circuit 26. The analog switches may be constructed by a well-known technique and the switching control voltages at which the respective analog switches become closed or conducting are different from each other. One of the analog switches becomes closed or conducting in accordance with the output voltage of the power-factor angle measuring circuit 26. The analog switch thus closed, outputs an input voltage fed through a corresponding variable resistor (28a, 28b or 28c) to the phase-shift pulse generator 22.

The variable resistors 28a, 28b and 28c may be a tri-ganged variable resistor and the specifications of the resistors are set to comply with three curves A, B and C of FIG. 7 which show the relations between the welding currents and the control voltage to the phase-shift pulse generator. By manipulating the tri-ganged variable resistor in accordance with a desired welding current, the control voltages corresponding to the curves A, B and C of FIG. 7 are supplied to the input terminals of the analog switches 28d, 28e and 28f.

The phase-shift pulse generator 22 comprises a uni-junction transistor 22a, a pulse transformer 22b, a capacitor 22c, diodes 22d and 22e and resistors 22f, 22g and 22h, a base $B_2$ of the transistor 22a is connected to the output terminal of the rectifier 16 through the resistor 22f, a base $B_1$ is grounded through the resistor 22g and input terminals of the pulse transformer 22b are connected across the resistor 22g. Output terminals of the pulse transformer 22b are connected to the gates of the thyristors 4a and 4b of the switching element 4, respectively. An emitter E of the transistor 22a is connected to the base B through the capacitor 22c, and connected to the analog switches 28d, 28e and 28f of the curve selection circuit 28 through the diode 22e, and also connected to the output terminal of the clamp circuit 18 through the resistor 22h, the diode 22d and a switch 44h to be described later.

The output terminal of the rectifier 16 is connected to one input terminal of the clamp circuit 18 and the output terminal of the clamp voltage setter 24 is connected to the other input terminal of the clamp circuit 18.

Numeral 44 denotes a testing phase-shift pulse generator which comprises a uni-junction transistor 44a, a pulse transformer 44b, a capacitor 44c, a diode 44d, resistors 44e and 44f, a variable resistor 44g and a switch 44h. An emitter E of the uni-junction transistor 44a is connected to the output terminal of the clamp circuit 18 through the switch 44h, the resistor 44e and the diode 44d, and a base $B_2$ of the transistor 44a is connected to a power supply +Vc through the variable resistor 44g. Output terminals of the pulse transformer 44b are connected to the thyristors 4a and 4b. The resistance of the variable resistor 44g of the phase-shift pulse generator 44 is preset such that a pulse signal of a 120 degrees firing angle is produced. The switch 44h is turned on and off by the controller not shown.

The operation of the resistance welder thus constructed is now explained.

The tri-ganged variable resistor comprising the variable resistors 28a, 28b and 28c is manually set to a position corresponding to a desired welding current, and the switch 38 of the integration circuit 26e is closed to initialize the integration circuit 26e and then the switch 38 is opened.

When current starts to be supplied as commanded by the controller not shown, the switch 37 of the integration circuit 26e is closed in synchronism with a zero crossing of the voltage of the power supply and the switch 44h of the testing phase-shift pulse generator 44 is switched to a position b. Then, the power is turned on. The switch 37 is controlled by the controller so that the switch 37 is closed for the first one cycle of a frequency of the power supply voltage only and opened in the second and subsequent cycles. The switch 44h is also controlled by the controller so that the switch 44h is switched to a position a after the end of the first cycle. A current in the first cycle after the power on is called a test current. During the first cycle, the testing phase-shift pulse generator 44 generates the pulse signal 120 degrees firing angle. Thus, an effective value of the test current is approximately 40% so that it is a current for measuring the power-factor angle and not directly contributing to the welding.

The comparators 26a and 26b produce high level signals only when the thyristors 4a and 4b are fired, respectively. The signals are supplied to the AND gate 26d, the output of which is supplied to the integration circuit 26e. The integration circuit 26e integrates the signal from the AND gate 26d and supplies a resulting integrated signal to the function generator 26f. When the thyristors 4a and 4b switch only once respectively, that is, when one cycle of conduction is terminated, the switch 37 is opened by the signal from the controller not shown and the integration in the one cycle is held. The integration represents a conduction angle in the test current cycle. A voltage corresponding to the integration held in the integration circuit 26e is produced at the output terminal of the function generator 26f. The voltage thus produced corresponds to the predetermined power-factor angle relating to the conduction angle as shown in FIG. 6. This voltage represents the power-factor angle of the load of the welder. One of the analog switches of the curve selection circuit 28 is closed by the output voltage of the function generator 26f so that a voltage corresponding to the power-factor angle of the load is produced at the output terminal of the curve selection circuit 28.

In this manner, during the supply of the test current, the control voltage to the phase-shift pulse generator for the target welding current which is most suitable to the power-factor angle of the load of the welder is produced. At the end of the first cycle after the power-on, the switch 44h is switched to the position a and the phase-shift generator 22 receives both a voltage controlled in accordance with the variation of power source voltage and a voltage sought in accordance with the welding current from one of the curves A, B and C which is selected in accordance with the power-factor angle, so that the firing signal corresponding to the sum of both voltages is produced. The thyristors 4a and 4b are fired in response to the firing signal so that the welding current is controlled.

A period of the firing signal produced by the phase-shift pulse generator 22 is determined by a charging time of the capacitor 22c and a potential at the base $B_2$. The charging time is determined by the output voltage of the clamp circuit 18 and the output voltage of the curve selection circuit 28, and the potential at the base $B_2$ is determined by the output voltage of the rectifier 16. The output voltage of the curve selection circuit 28 for a given target current changes depending on the selected one of analog switch and assumes a value in accordance with one of the three curves shown in FIG. 7. If the potential at the base $B_2$ of the transistor 22a is constant, the charging time of the capacitor 22c is shortest and the period of the firing signal is shortest when the curve A of FIG. 7 is selected. Thus, for the selected target welding current, the period of the firing signal produced by the phase-shift pulse generator 22 can be varied in accordance with the power-factor angle of the load of the welder.

If a time required to charge the capacitor 22c to a certain potential level is constant, the lower the potential of the base $B_2$ is, the shorter is the period of the firing signal. Accordingly, if the power supply voltage drops and the output voltage of the rectifier 16 drops, the period of the firing signal from the phase-shifter generator 22 is shortened to increase the welding current. This control is same as that of the prior art welder.

What is claimed is:

1. In a resistance welder having an A.C. power supply, a switching element for phase-controlling a voltage from said A.C. power supply to supply a welding current to a welding transformer and a phase-shift pulse generator for supplying a pulse to said switching element to control a firing angle so that said voltage is phase-controlled; a method for controlling the welding current to a target value comprising test current supply steps carried out in a first cycle of an A.C. supply and weld current supply steps carried out after said test current supply steps have been carried out, said test current supply steps including:
   (a) causing said switching element to conduct through a predetermined firing angle during the first cycle of the A.C. supply;
   (b) detecting a conduction angle of said switching element during the first cycle of the A.C. power supply;
   (c) calculating a power-factor angle on the basis of the conduction angle detected in said step (b) and a predetermined relationship between the conduction angle and the power-factor angle; and
   (d) selecting a curve corresponding to the measured power-factor angle from a plurality of predetermined curves representing relations between the welding currents and control voltages to said phase-shift pulse generator for a plurality of power-factor angles of the load; and said weld current supply steps including:
   (e) measuring a variation of the voltage of said A.C. power supply; and
   (f) controlling a period of the pulse from said phase-shift pulse generator based on a value determined in accordance with the selected curve and the measured variation of the voltage and supplying the pulse to said switching element.

2. A method for controlling a welding current according to claim 1 wherein the conduction angle detecting step includes the step of measuring a time period in which voltages at an input end and an output end of said switching element are equal.

3. A method for controlling a welding current according to claim 1 wherein said switching element is a thyristor.

4. A method for controlling a welding current according to claim 1 wherein said phase-shift pulse generator includes a uni-junction transistor and produces said pulse in response to the conduction of said transistor.

5. A method for controlling a welding current according to claim 1 wherein said period of said pulse is controlled such that the period is shorter as the power-factor angle of the load increases and is shorter as the voltage of said A.C. power supply decreases.

6. A resistance welder comprising:
   an A.C. power supply;
   a swticing element for phase-controlling a voltage from said A.C. power supply to supply a welding current to a welding transformer;
   a phase-shift pulse generator for supplying a pulse to said switching element to control a firing angle so that said voltage is phase-controlled;
   means for causing said switching element to conduct through a predetermined firing angle during a first cycle of the A.C. supply;

means for detecting a conduction angle of said switching element during the first cycle of the A.C. power supply;

means for calculating a power-factor angle on the basis of the conduction angle detected by said detecting means and a predetermined relationship between the conduction angle and the power-factor angle;

means for selecting a curve corresponding to the measured power-factor angle from a plurality of predetermined curves representing relations between the welding currents and control voltages to said phase-shift pulse generator for a plurality of power-factor angles of the load;

means for measuring a variation of the voltage of said A.C. power supply; and means for controlling a period of the pulse from said phase-shift pulse generator based on a value determined in accordance with the selected curve and the measured variation of the voltage and supplying the pulse to said switching element.

7. Apparatus as in claim 6 wherein the conduction angle detecting means includes means for measuring a time period in which voltages at an input end and an output end of said switching element are equal.

8. Apparatus as in claim 6 wherein said switching element is a thyristor.

9. Apparatus as in claim 6 wherein said phase-shift pulse generator includes a uni-junction transistor and produces said pulse in response to the conduction of said transistor.

10. Apparatus as in claim 6 wherein said period of said pulse is controlled such that the period is shorter as the power-factor angle of the load increases and is shorter as the voltage of said A.C. power supply decreases.

* * * * *